United States Patent
Kedem et al.

(10) Patent No.: US 7,424,482 B2
(45) Date of Patent: Sep. 9, 2008

(54) METHOD AND SYSTEM FOR COMPRESSION OF DATA FOR BLOCK MODE ACCESS STORAGE

(75) Inventors: Nadav Kedem, Tel Aviv (IL); Yoni Amit, Omer (IL); Noach Amit, Haifa (IL)

(73) Assignee: Storwize Inc., Gaithersburg, MD (US)

( * ) Notice: Subject to any disclaimer, the term of this patent is extended or adjusted under 35 U.S.C. 154(b) by 205 days.

(21) Appl. No.: 11/258,379

(22) Filed: Oct. 26, 2005

(65) Prior Publication Data

US 2006/0136365 A1   Jun. 22, 2006

Related U.S. Application Data

(63) Continuation-in-part of application No. PCT/IL2005/000419, filed on Apr. 21, 2005, which is a continuation-in-part of application No. 11/246,544, filed on Oct. 11, 2005, now abandoned.

(60) Provisional application No. 60/565,298, filed on Apr. 26, 2004.

(51) Int. Cl.
  *G06F 17/00* (2006.01)
  *G06F 12/00* (2006.01)
(52) U.S. Cl. .................. 707/101; 707/1; 707/200; 711/4
(58) Field of Classification Search ............ 707/1, 707/101, 200; 709/247; 711/4
  See application file for complete search history.

(56) References Cited

U.S. PATENT DOCUMENTS

| | | | |
|---|---|---|---|
| 5,761,536 A | 6/1998 | Franaszek | |
| 5,774,715 A | 6/1998 | Madany | |
| 5,778,411 A * | 7/1998 | DeMoss et al. ............ 711/4 |
| 5,813,011 A * | 9/1998 | Yoshida et al. ............ 707/101 |
| 5,813,017 A | 9/1998 | Morris | |
| 6,092,071 A | 7/2000 | Bolan et al. | |
| 6,115,787 A | 9/2000 | Obara | |
| 6,349,375 B1 | 2/2002 | Faulkner et al. | |
| 6,532,121 B1 | 3/2003 | Rust et al. | |
| 6,577,734 B1 | 6/2003 | Etzel et al. | |
| 6,584,520 B1 | 6/2003 | Cowart et al. | |
| 6,678,828 B1 | 1/2004 | Pham et al. | |
| 2002/0097172 A1 | 7/2002 | Fallon | |
| 2004/0030813 A1 | 2/2004 | Benveniste et al. | |
| 2005/0021657 A1 | 1/2005 | Negishi et al. | |

(Continued)

FOREIGN PATENT DOCUMENTS

WO   95/18997 A2   7/1995

OTHER PUBLICATIONS

Wee Keong Ng et al., Block-Oriented Compression Techniques for Large Statistical databases, 1997, IEEE, pp. 314-328.*

(Continued)

*Primary Examiner*—Shahid Alam
*Assistant Examiner*—Fred I Ehichioya
(74) *Attorney, Agent, or Firm*—Browdy and Neimark

(57) ABSTRACT

A method and system for creating, reading and writing compressed data for use with a block mode access storage. The compressed data are packed into plurality of compressed units and stored in a storage logical unit (LU). One or more corresponding compressed units may be read and/or updated with no need of restoring the entire storage logical unit whilst maintaining de-fragmented structure of the LU.

10 Claims, 14 Drawing Sheets

U.S. PATENT DOCUMENTS

2005/0125384 A1    6/2005    Gilfix et al.

OTHER PUBLICATIONS

EMC White Paper, Leveraging Networked Storage for Your Business, Mar. 2003.

Ziv, J. et al., "A Universal Algorithm for Sequential Data Compression" IEEE Transactions on Information Theory, vol. IT-23, No. 3, May 1977, pp. 337-343.

Kampf, F.A., "Performance as a Function of Compression," IBM Systems Journal, 1998, vol. 42, No. 6, pp. 1-2.

Pajarola et al., "An Image Compression Method for Spatial Search," 2000, IEEE, pp. 358, 359 and 364.

Wee-Keong et al., "Block-Oriented Compression Techniques for Large Statistical Databases," Mar.-Apr. 1997, vol. 9, issue 2, p. 318 section 3.2 and 321 section 4.3.

I. C. Tuduce et al., "Adaptive Main Memory Compression", Apr. 15, 2005, Internet Article.

P. R. Wilson et al., "Dynamic Storage Allocation: A Survey and Critical Review", 1995, Internet Article, XP-002420154.

M. D. Flouris et al., "Violin: A Framework for Extensible Block-level Storage", Apr. 2005, Internet Article.

B. Praveen et al., "Design and Implementation of a File System with on-the-fly Data Compression for GNU/Linux", Feb. 2000, Internet Article.

P. T. Breuer et al., "The Network Block Device", Dec. 1999, Internet Article.

R. Dykhuis, "Compression with Stacker and DoubleSpace", Computers in Libraries, vol. 13, No. 5, pp. 27-29, May 1993. XP-000671468.

T. R. Halfhill, "How Safe is Data Compression?", BYTE.COM Online, Feb. 1994. XP-002419411.

Anon, "How NTFS Works", Mar. 28, 2003, Internet Article. XP-002419412.

T. Kawashima et al., "A Universal Compressed Data Format for Foreign File Systems", IEEE, p. 429, 1995.

Z. M. Yusof et al., "Compressed Memory Core", pp. 50-52, Electronic Systems and Control Division Research 2003, Internet Article.

Storewiz, "A new approach to data compression", 2007, Internet Article. XP-002419413.

* cited by examiner

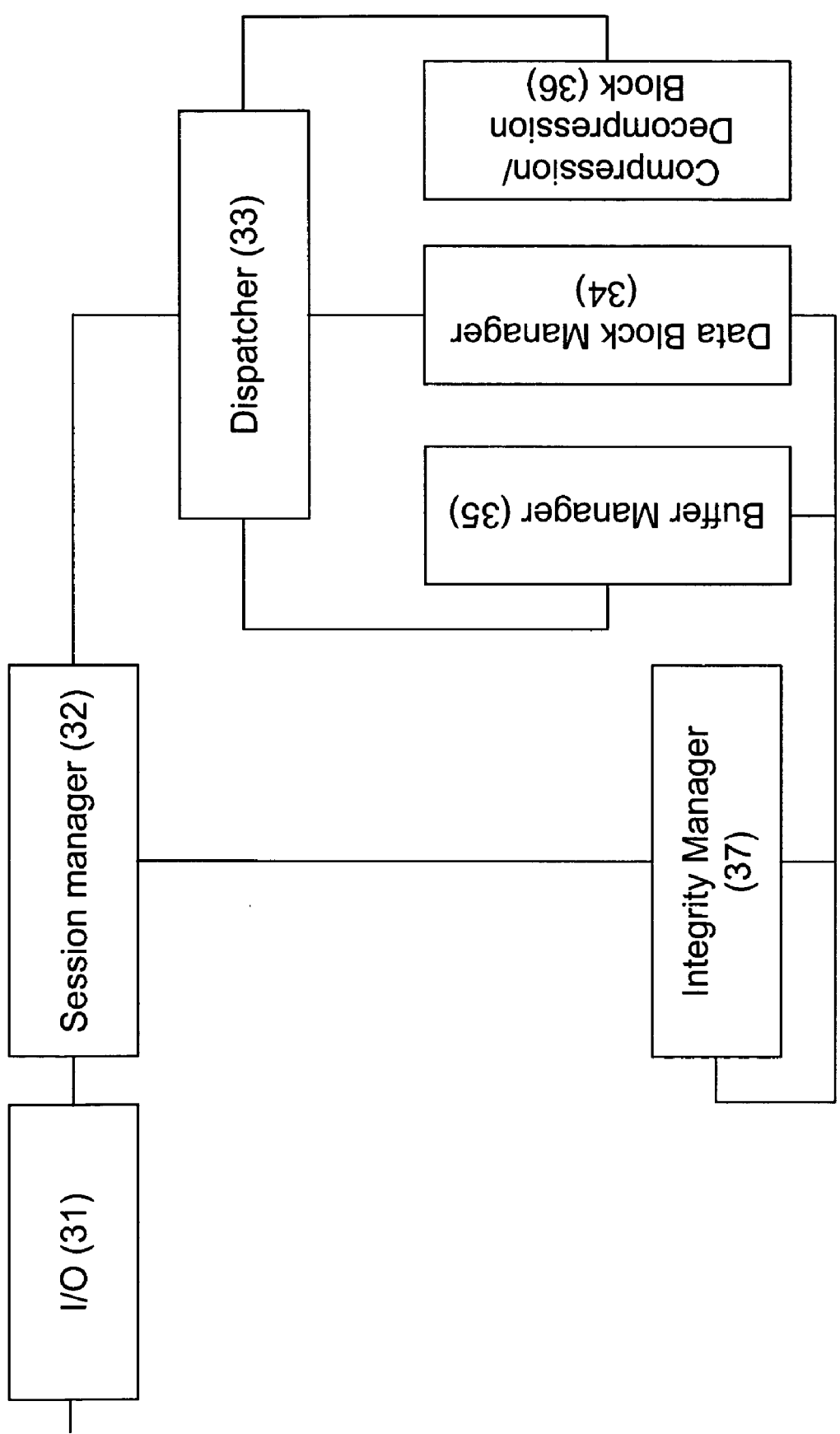

METHOD AND SYSTEM FOR COMPRESSION OF DATA FOR BLOCK MODE ACCESS STORAGE

CROSS REFERENCE TO RELATED APPLICATIONS

The present application is a continuation-in-part of International Application No. PCT/IL2005/000419, filed Apr. 21, 2005, which claims priority of U.S. Provisional Application No. 60/565,298, filed Apr. 26, 2004. The entire contents of both applications being hereby incorporated herein by reference.

FIELD OF THE INVENTION

This invention relates to computing systems and, in particular, to a method and apparatus facilitating compression and operation on compressed data over block storage protocols.

BACKGROUND OF THE INVENTION

In current business environment, all types of business data are becoming more and more critical to business success. The tremendous growth and complexity of business-generated data is driving the demand for information storage, defining the way of sharing, managing and protection of information assets.

Typically, no single technology or architecture is able to address all needs of any organization. Main storage technologies are described, for example, in the White Paper by EMC, "Leveraging Networked storage for your business", March, 2003, USA and basically can be identified by location and connection type (intra-computer storage, direct attached storage (DAS), IP, channel networks, etc.) and by the method that data is accessed. There are three basic types of storage architectures to consider in connection with methods of data access: Block Access, File Access, and Object Access.

In block mode access architecture, the communication between a server/client and a storage medium occurs in terms of blocks; information is pulled block by block directly from the disk. The operation system keeps track of where each piece of information is on the disk, while the storage medium is usually not aware of the file system used to organize the data on the device. When something needs to get read or be written, the data are directly accessed from the disk by that processor which knows where each block of data is located on the disk and how to put them together. Examples of block mode access storage technologies are DAS (Direct Attached Storage), SAN (Storage Area Network), Block Storage over IP (e.g. FCIP, iFCP, iSCSI, etc.), intra-memory storage, etc.

File access requires the server or client to request a file by name, not by physical location. As a result, a storage medium (external storage device or storage unit within computer) is usually responsible to map files back to blocks of data for creating, maintaining and updating the file system, while the block access is handled "behind the scene". The examples of file access storage technologies are NAS (Network Attached Storage with NFS, CIFS, HTTP, etc. protocols), MPFS (Multi-Pass File Serving), intra-computer file storage, etc. The file access storage may be implemented, for example, for general purpose files, web applications, engineering applications (e.g. CAD, CAM, software development, etc.), imaging and 3D data processing, multi-media streaming, etc.

Object access further simplifies data access by hiding all the details about block, file and storage topology from the application. The object access occurs over API integrated in content management application. The example of object access storage technology is CAS (Content Addressed Storage).

More efficient use of storage may be achieved by data compression before it is stored. Data compression techniques are used to reduce the amount of data to be stored or transmitted in order to reduce the storage capacity and transmission time respectively. Compression may be achieved by using different compression algorithms, for instance, a standard compression algorithm, such as that described by J. Ziv and A.. Lempel, "A Universal Algorithm For Sequential Data Compression," IEEE Transactions on Information Theory, IT-23, pp. 337-343 (1997). It is important to perform compression transparently, meaning that the data can be used with no changes to existing applications. In either case, it is necessary to provide a corresponding decompression technique to enable the original data to be reconstructed and accessible to applications. When an update is made to a compressed data, it is generally not efficient to decompress and recompress the entire block or file, particularly when the update is to a relatively small part of data.

Various implementations of optimization of storage and access to the stored data are disclosed for example in the following patent publications:

U.S. Pat. No. 5,761,536 (Franaszek) discloses a system and method for storing variable length objects such that memory fragmentation is reduced, while avoiding the need for memory reorganization. A remainder of a variable length object may be assigned to share a fixed-size block of storage with a remainder from another variable length object (two such remainders which share a block are referred to as roommates) on a best fit or first fit basis. One remainder is stored at one end of the block, while the other remainder is stored at the other end of the block. The variable length objects which are to share a block of storage are selected from the same cohort. Thus, there is some association between the objects. This association may be that the objects are from the same page or are in some linear order spanning multiple pages, as examples. Information regarding the variable length objects of a cohort, such as whether an object has a roommate, is stored in memory.

U.S. Pat. No. 5,813,011 (Yoshida et al.) discloses a method and apparatus for storing compressed data, wherein compressed file consists of: a header that carries information showing the position of a compression management table; compressed codes; and the compression management table that holds information showing the storage location of the compressed code of each original record.

U.S. Pat. No. 5,813,017 (Morris et al.) discloses a method and means for reducing the storage requirement in the backup subsystem and further reducing the load on the transmission bandwidth where base files are maintained on the server in a segmented compressed format. When a file is modified on the client, the file is transmitted to the server and compared with the segmented compressed base version of the file utilizing a differencing function but without decompressing the entire base file. A delta file which is the difference between the compressed base file and the modified version of the file is created and stored on a storage medium which is part of the backup subsystem.

U.S. Pat. No. 6,092,071 (Bolan et al.) discloses a system for control of compression and decompression of data based upon system aging parameters, such that compressed data becomes a system managed resource with a distinct place in the system storage hierarchy. Processor registers are backed by cache, which is backed by main storage, which is backed by decompressed disk storage, which is backed by compressed disk storage then tape, and so forth. Data is moved from decompressed to compressed form and migrated through the storage hierarchy under system control according to a data life cycle based on system aging parameters or, optionally, on demand: data is initially created and stored; the data is compressed at a later time under system control; when the data is accessed, it is decompressed on demand by segment; at some later time, the data is again compressed under system control until next reference. Large data objects are segmented and compression is applied to more infrequently used data.

U.S. Pat. No. 6,115,787 (Obara et al.) discloses a disk storage system, wherein data to be stored in the cache memory is divided into plural data blocks, each having two cache blocks in association with track blocks to which the data belongs and are compressed, thus providing the storage of plural compressed records into a cache memory of a disk storage system in an easy-to-read manner. The respective data blocks after the compression are stored in one or plural cache blocks. Information for retrieving each cache block from an in-track address for the data block is stored as part of retrieval information for the cache memory. When the respective data blocks in a record are read, the cache block storing the compressed data block is determined based on the in-track address of the data block and the retrieval information.

U.S. Pat. No. 6,349,375 (Faulkner et al.) discloses a combination of data compression and decompression with a virtual memory system. A number of computer systems are discussed, including so-called embedded systems, in which data is stored in a storage device in a compressed format. In response to a request for data by a central processing unit (CPU), the virtual memory system will first determine if the requested data is present in the portion of main memory that is accessible to the CPU, which also happens to be where decompressed data is stored. If the requested data is not present in the decompressed portion of main memory, but rather is present in a compressed format in the storage device, the data will be transferred into the decompressed portion of main memory through a demand paging operation. During the demand paging operation, the compressed data will be decompressed. Likewise, if data is paged out of the decompressed portion of main memory, and that data must be saved, it can also be compressed before storage in the storage device for compressed data.

U.S. Pat. No. 6,532,121 (Rust et al.) discloses a compression system storing meta-data in the compressed record to allow better access and manage merging data. Markers are added to the compression stream to indicate various things. Each compressed record has a marker to indicate the start of the compressed data. These markers have sector number as well as the relocation block numbers embedded in their data. A second marker is used to indicate free space. When compressed data is stored on the disk drive, free space is reserved so that future compression of the same or modified, data has the ability to expand slightly without causing the data to be written to a different location. Also the compressed data can shrink and the remaining space can be filled in with this free space marker. A third type of marker is the format pattern marker. Compression algorithms generally compress the format pattern very tightly. However, the expectation is that the host will write useful data to the storage device. The compressor is led typical data in the region of the format pattern but a marker is set in front of this data to allow the format pattern to be returned rather than the typical data.

U.S. Pat. No. 6,584,520 (Cowart et al.) discloses a method of storage and retrieval of compressed files. The method involves dynamically generating file allocation table to retrieve compressed file directly from compact disk read only memory.

U.S. Pat. No. 6,678,828 (Pham et al.) discloses a secure network file access appliance supporting the secure access and transfer of data between the file system of a client computer system and a network data store. An agent provided on the client computer system and monitored by the secure network file access appliance ensures authentication of the client computer system with respect to file system requests issued to the network data store. The secure network file access appliance is provided in the network infrastructure between the client computer system and network data store to apply qualifying access policies and selectively pass through to file system requests. The secure network file access appliance maintains an encryption key store and associates encryption keys with corresponding file system files to encrypt and decrypt file data as transferred to and read from the network data store through the secure network file access appliance.

U.S. Patent Application No. 2004/030,813 (Benveniste et al.) discloses a method and system of storing information, includes storing main memory compressed information onto a memory compressed disk, where pages are stored and retrieved individually, without decompressing the main memory compressed information.

U.S. Patent Application No. 2005/021,657 (Negishi et al.) discloses a front-end server for temporarily holding an operation request for a NAS server, which is sent from a predetermined client, is interposed between the NAS server and clients on a network. This front-end server holds information concerning a correlation among data files stored in the NAS server, optimizes the operation request received from the client based on the information, and transmits the operation request to the NAS server.

SUMMARY OF THE INVENTION

There is a need in the art to provide for a new system and method of compressed storage for use with block mode access storage with no derogating of storing and retrieving capabilities and with no need of a user's awareness of compression/decompression operations as well as the storage location of the compressed data. The invention, in some of its aspects, is aimed to provide a novel solution capable of facilitating random access to compressed data and, thus, enabling operations on the compressed data with no need for decompression of entire compressed blocks.

In accordance with certain aspects of the present invention, there is provided, for use with block mode access storage, a method and system for creating, reading and writing compressed data; said method and system facilitating direct access to the compressed data whilst maintaining de-fragmentation of the compressed file.

In accordance with certain aspects of the present invention, said method of creating compressed data for storage in at least one storage logical unit comprises:

a) creating in respect to at least one storage logical unit (LU) a corresponding virtual logical unit (VLU) accessible by said block mode access protocol and configured to virtually accommodate raw data, wherein a size of the virtual logical unit corresponds to an estimated size of raw data which, being compressed, would substantially amount to a size of the storage logical unit;

b) segmenting the virtual logical unit into one or more virtual storage portions constituting clusters;

c) compressing the raw data accommodated in a cluster and thereby generating compressed data to be stored in a respective compressed section within the storage logical unit;

d) facilitating mapping between the compressed data stored in the compressed section and their virtual accommodation at the virtual logical unit.

In accordance with further aspects of the present invention the compressed section is divided into at least one fixed-size compression logical units (CLU) and the storage logical unit comprises a section table with at least one record describing a compressed section, said record holding at least information on CLUs corresponding to the compressed section and storage location pointers pertaining to said CLUs.

For reading data compressed and stored as above, said method comprises:
a) determining first cluster to be read;
b) determining a serial number of corresponding compressed section;
c) facilitating restoring the data corresponding to said cluster
d) repeating the stages b) and c) for compressed sections with serial numbers incremented by 1 if the range of data to be read exceeds the size of the restored corresponding clusters, until all data to be read are restored.

For writing data compressed and stored as above, said method comprises:
a) determining first cluster to be updated thereby constituting the original cluster;
b) determining a serial number of corresponding compressed section;
c) facilitating restoring the data corresponding to said original cluster;
d) calculating an offset of the updating data within said cluster and facilitating the update at the given data range;
e) compressing the updated cluster into an updated compressed section;
f) facilitating overwriting said original compressed section with updated compressed section;
g) repeating stages b) to f) for compressed sections with serial numbers incremented by 1 if the range of data to be written exceeds the size of the restored corresponding clusters, until all required data are written.

In accordance with further aspects of the present invention the method comprises handling a list of free CLUs released during writing data, said list is handling until the LU is disconnected. The method further comprising comparing the numbers of CLUs required to said original $N_o$ and updated $N_u$ compressed section and facilitating one of the following:
a) overwriting all CLUs corresponding to the original compressed section with CLUs corresponding to the updated compressed section if $N_o = N_u$;
b) overwriting first $N_u$ CLUs corresponding to the original compressed section with CLUs corresponding to the updated compressed section and updating the list of free CLUs about released CLUs if $N_o > N_u$;
c) overwriting all CLUs corresponding to the original compressed section with CLUs corresponding to the updated compressed section and writing the rest of CLUs corresponding to the updated compressed section to the CLUs contained in the list of free CLUs, if $N_o < N_u < N_o + N_f$, where $N_f$ is a number of CLUs in said list;
d) overwriting all CLUs corresponding to the original compressed section with CLUs corresponding to the updated compressed section, writing the CLUs corresponding to the updated compressed section to the CLUs contained in the list of free CLUs, and continuous writing the rest of CLUs corresponding to the updated compressed section to next free storage location if $N_o + N_f < N_u$.

In accordance with further aspects of the present invention the method further comprises
a) checking the list of free CLUs before disconnecting the storage logical unit;
b) if said list is not empty defining a CLU with the highest storage location pointer among CLUs comprised in the compressed sections (first CLU);
c) facilitating moving the compressed data from said first CLU to a free CLU with lower storage location pointer (second CLU);
d) assigning said second CLU to pertaining compressed section and said first CLU to the list of free CLUs;
e) repeating the stages b)-d) until the storage location pointers of all CLUs comprised in compressed sections are lower than a pointer of any of CLU comprising in the list of free CLUs;
f) updating the section table.

According to further aspects of the present invention, said system is configured to perform at least the following:
a) creating in respect to at least one storage logical unit a corresponding virtual logical unit accessible by said block mode access protocol and configured to virtually accommodate raw data, wherein a size of the virtual logical unit corresponds to an estimated size of raw data which, being compressed, would substantially amount to a size of the storage logical unit;
b) segmenting the virtual logical unit into one or more virtual storage portions constituting clusters;
c) compressing the raw data accommodated in a cluster and thereby generating compressed data to be stored in a respective compressed section within the storage logical unit;
d) facilitating mapping between the compressed data stored in the compressed section and their virtual accommodation at the virtual logical unit.

It is to be understood that the system according to the invention may be a suitably programmed computer. Likewise, the invention contemplates a computer program being readable by a computer for executing the method of the invention. The invention further contemplates a machine-readable memory, tangibly embodying a program of instructions executable by the machine for executing the method of the invention.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 3 is a schematic block diagram of the system functional architecture in accordance with certain embodiments of the present invention.

DETAILED DESCRIPTION OF THE INVENTION

Figure 1B:
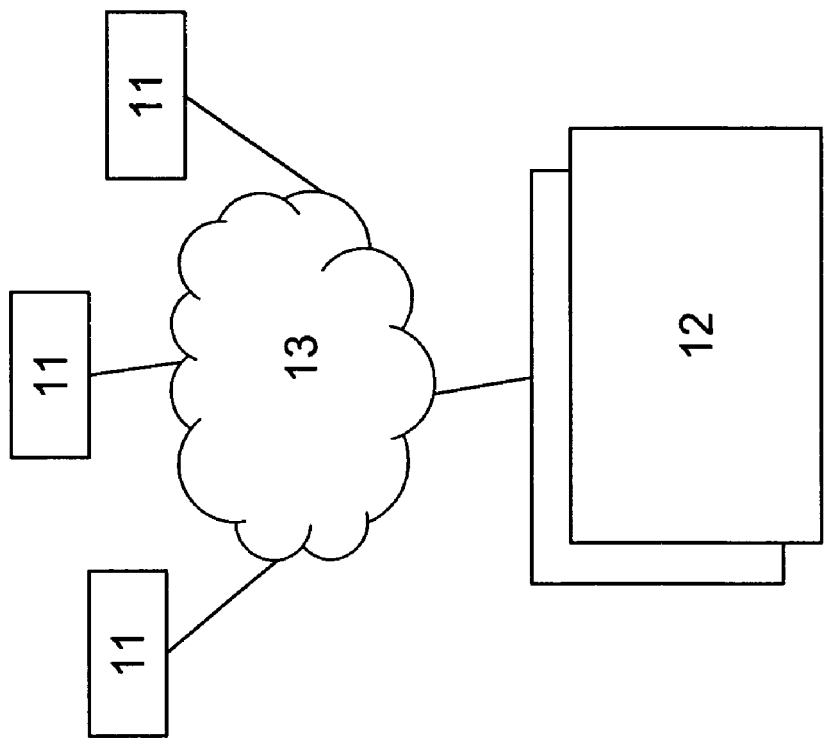
FIGS. 1a), 1b) 1c) are schematic block diagrams of typical block mode access storage architectures as known in the art.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention. In the drawings and descriptions, identical reference numerals indicate those components that are common to different embodiments or configurations.

Unless specifically stated otherwise, as apparent from the following discussions, it is appreciated that throughout the specification discussions, utilizing terms such as, "processing", "computing", "calculating", "determining", or the like, refer to the action and/or processes of a computer or computing system, or processor or similar electronic computing device, that manipulate and/or transform data represented as physical, such as electronic, quantities within the computing system's registers and/or memories into other data, similarly represented as physical quantities within the computing system's memories, registers or other such information storage, transmission or display devices.

Embodiments of the present invention may use terms such as processor, computer, apparatus, system, sub-system, module, unit, device (in single or plural form) for performing the operations herein. This may be specially constructed for the desired purposes, or it may comprise a general purpose computer selectively activated or reconfigured by a computer program stored in the computer. Such a computer program may be stored in a computer readable storage medium such as, but not limited to, any type of disk including, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

The processes/devices (or counterpart terms specified above) and displays presented herein are not inherently related to any particular computer or other apparatus, unless specifically stated otherwise. Various general purpose systems may be used with programs in accordance with the teachings herein, or it may prove convenient to construct a more specialized apparatus to perform the desired method. The desired structure for a variety of these systems will appear in the description below. In addition, embodiments of the present invention are not described with reference to any particular programming language. It will be appreciated that a variety of programming languages may be used to implement the teachings of the inventions as described herein.

Figure 1A:
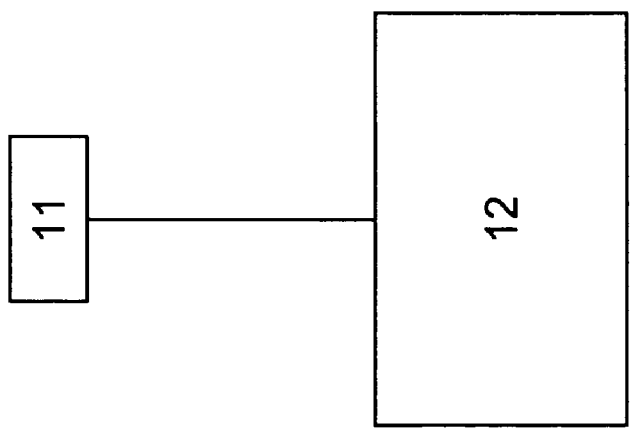
Figure 1C:
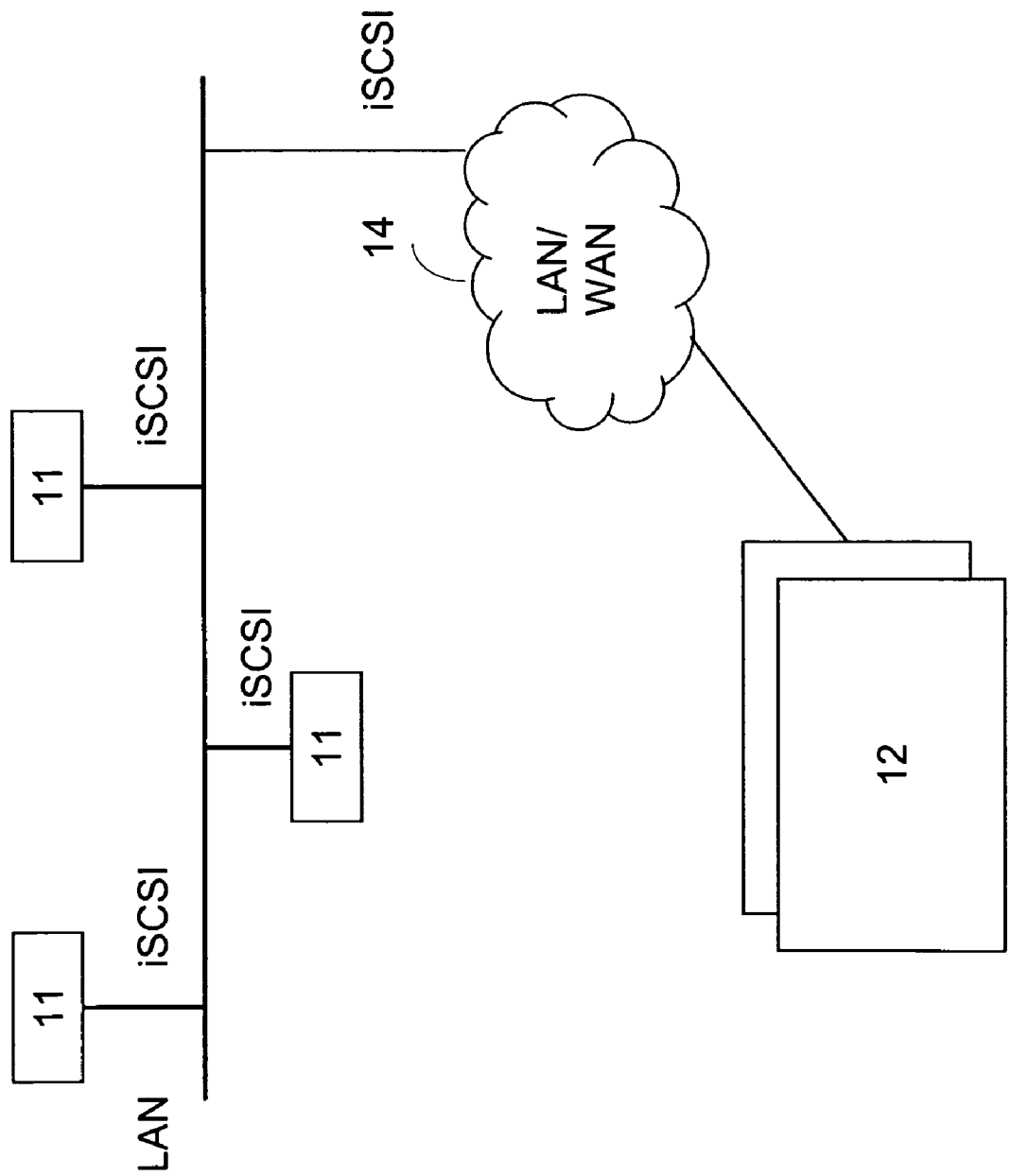

Bearing this in mind, attention is drawn to FIGS. 1a-1c illustrating block diagrams of typical block mode access storage architectures as known in the art.

FIG. 1a illustrates typical DAS (Direct Attached Storage) architecture wherein a storage device 12 is directly connected to a computer 11 by connectivity media via block mode access storage protocols (e.g. SCSI, Fiber Channel, etc.). This direct connection provides fast access to the data; however, storage is only accessible from that server. DAS includes, for example, the internally attached local disk drives or externally attached RAID (redundant array of independent disks) or JBOD Oust a bunch of disks).

FIG. 1b illustrates typical architecture of Storage Area Network (SAN) providing access to storage subsystems using block mode access storage protocols. The storage subsystems include host computer(s) 11 (typically with host bus adapters (HBAs)), FC network (SAN) 13 for routing the storage traffic and storage device(s) 12. The storage subsystems are generally available to multiple hosts at the same time.

FIG. 1c illustrates typical architecture of storage network based on iSCSI protocol which enables transport of block data between computer(s) 11 and the storage device(s) 12 over IP network 14 without the need for a specialized network infrastructure, such as, for example, Fiber Channel.

Figure 2B:
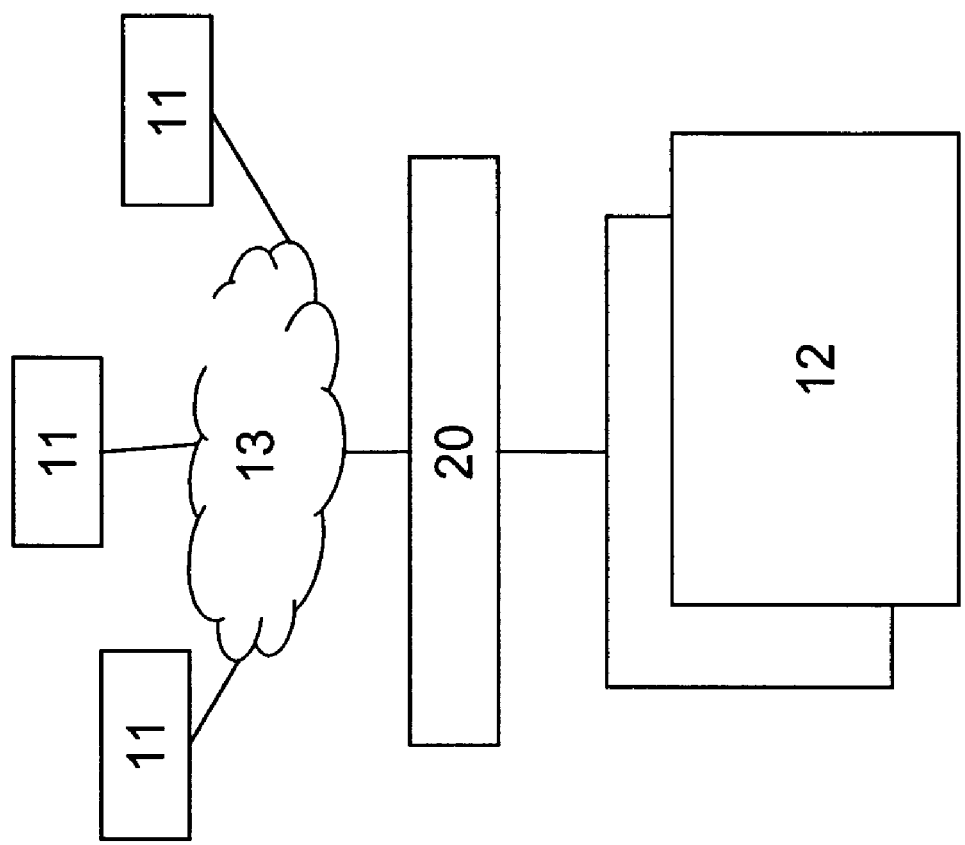
FIGS. 2a), 2b) and 2c) are schematic block diagrams of storage architectures in accordance with certain embodiments of the present invention.
Figure 2A:
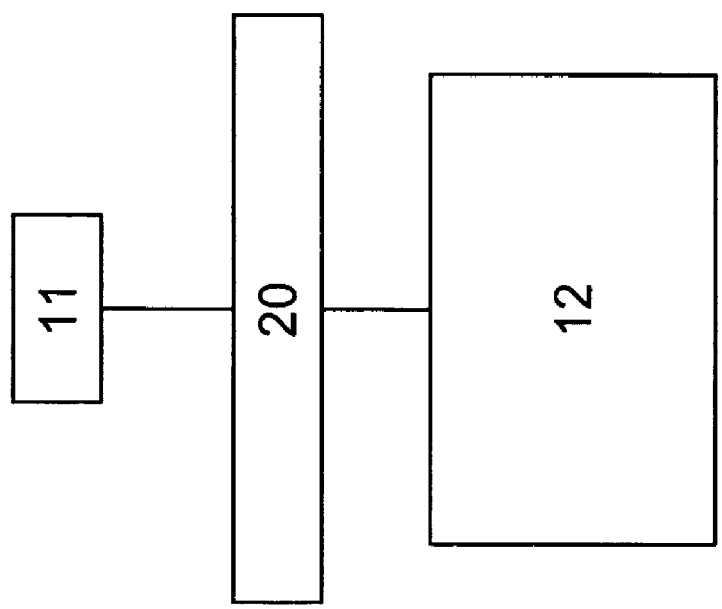
Figure 2C:
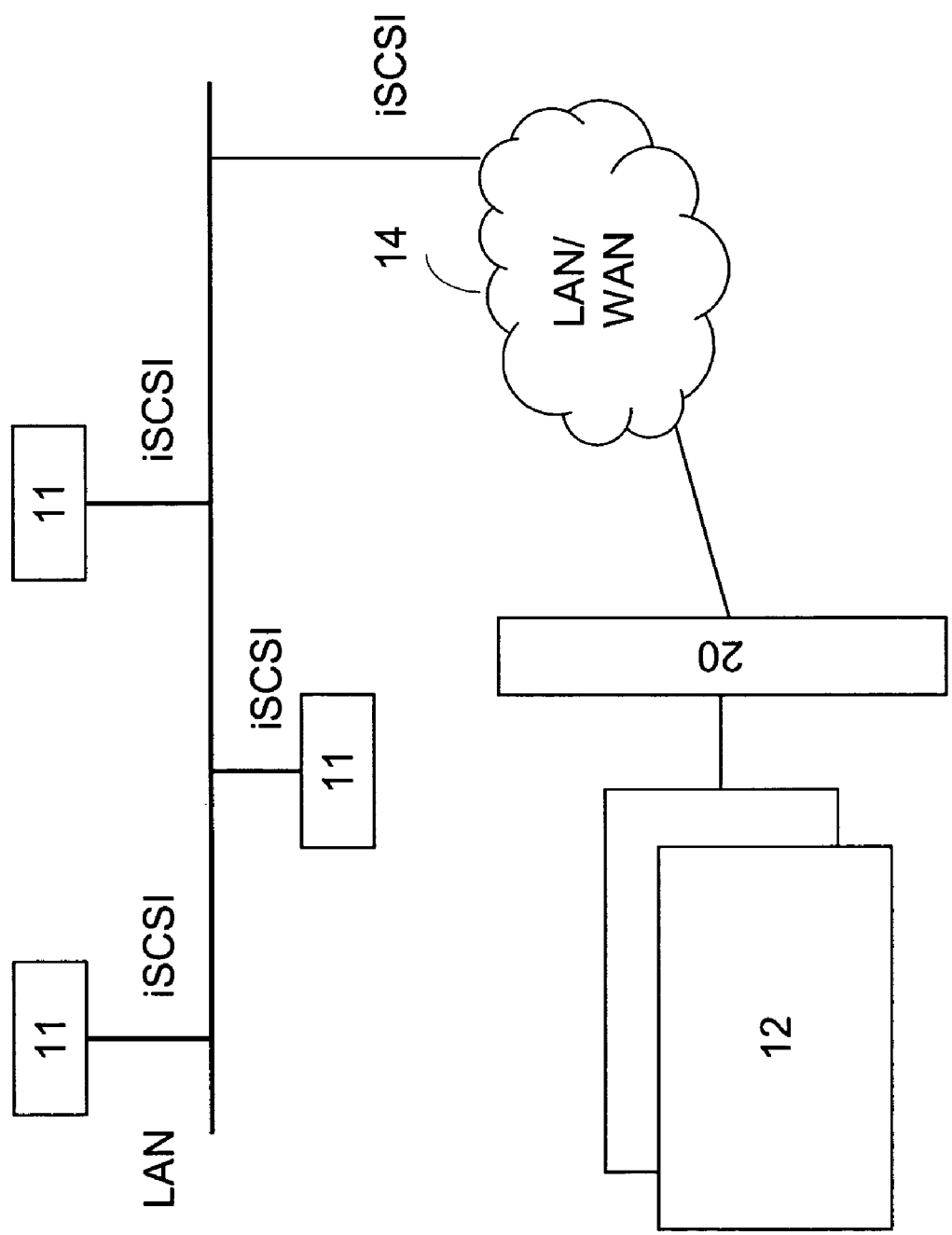

Referring to FIGS. 2a-2c, there are illustrated, by way of non-limiting examples, schematic diagrams of storage architecture in accordance with certain embodiments of the present invention. FIG. 2a illustrates certain embodiments of the present invention for DAS storage architecture illustrated in FIG. 1a; FIG. 2b illustrates certain embodiments of the present invention for SAN storage architecture illustrated in FIG. 1b and FIG. 2c illustrates certain embodiments of the present invention for iSCSI storage architecture illustrated in FIG. 1c. A compression system 20 is coupled to the computer(s) 11 (e.g. directly to the computer or the respective LAN, indirectly via storage network 13, IP network 14, etc.) via interface 21 and to the storage device(s) via interface 22. The compression system 20 acts as a bridge between the computer(s) and the storage device(s). The platform 20 may support any physical interfaces (e.g. Ethernet, Fiber Channel, etc.) and may be configured to preserve the storage device features such as, for example, redundancy, mirroring, snapshots, failover, rollback, management, etc. The platform may be configured for seamless integration with existing network infrastructure. A user need not be aware of the compression and decompression operations and the storage location of compressed data.

The compression system is configured to intercept communication between the computer(s) and the storage device(s), and to derive and compress data blocks corresponding to the data access-related request.

During "write" operation on the data blocks to be compressed before storage, the data blocks from the computer intercepted by the compression system 20, compressed and moved to the storage device 12. Data blocks containing different kinds of data (e.g. text, image, voice, etc.) may be compressed by different compression algorithms. A "read" operation proceeds in reverse direction; the required data blocks are retrieved by the compression system, decompressed (partly or entirely, in accordance with required data range) and sent to the appropriate API.

The compression system 20 is configured to transfer selected control-related requests (e.g. format disk, de-fragment disk, take a snapshot, etc.) between the computer and the storage device in a transparent manner, while intervening in data access-related transactions (e.g. read, write, etc.) and some control related transactions (e.g. capacity status, etc.)

In certain embodiments of the invention the compression system 20 may also be configured to compress only selected passing blocks of data in accordance with pre-defined criteria (e.g. LUN number, size, IP address, type of data, etc.).

The raw data (or their relevant part) are compressed by the compression system 20 during or before writing to the storage device 12. Similarly, the compressed data (or their relevant part) are decompressed by the compression system 20 during or after reading from the storage device 12.

As known in the art, the typical storage systems and networks are able to recognize the divided organization of storage. A storage disk or a set of disks may be conceptually divided in logical unit(s). Logical units (LU) can directly correspond to a volume drive, to a host application, storage device, etc. and constitute a logical representation of physical storage. Each logical unit has an address, known as the logical unit number (LUN), which allows it to be uniquely identified. Users can determine whether a LUN is a disk drive, a number of disk drives, a partition on a disk drive, etc.

In accordance with certain embodiments of the present invention, the compression system 20 is configured to create in respect to at least one logical unit (LU) a corresponding virtual logical unit (VLU) with a size larger than the size of LU. A ratio between the size of LU and VLU is defined in accordance with expected compression rate; accordingly, the size of the VLU corresponds to the estimated size of raw data which, being compressed, would substantially amount to the LU size. (For example, in certain embodiments of the present invention, a typical ratio between size of VLU and LU is estimated as 3 for e-mails, as 8 for a database data, etc.) When intercepting the communication between the computer and the storage device, the compression system addresses data access-related requests from the computer to the VLU instead the LU and the VLU provides virtual accommodation of raw data. Thus, in accordance with certain aspects of the present invention, the computer's operating system (OS) will relate on the VLU as a virtual representation of raw data storage, the compression system will compress the corresponding data to the LU of the storage device and facilitate mapping between the compressed data and their virtual representation at the VLU. The operations on the compressed data in accordance with certain embodiments of the present invention will be further described with reference to FIGS. 3-9 below.

Note that the invention is not bound by the specific architecture described with reference to FIGS. 1 and 2. Those versed in the art will readily appreciate that the invention is, likewise, applicable to any computing systems and any storage network architecture comprising block storage protocols (e.g. SCSI, Fiber Channel, iSCSI, etc.). The functions of the compression system 20 (or part of them) may be implemented in a stand-alone server(s) (as illustrated in FIGS. 2a-2c), distributed between several platforms or integrated within other storage network elements (e.g. file servers, enterprise switches, etc.).

FIG. 3 illustrates a schematic functional block diagram of the compression system 20 in accordance with certain embodiments of the present invention.

The compression system comprises an Input/Output (I/O) block 31 coupled to a session manager 32. The I/O block gets data access-related requests (e.g. read, write, etc.) and forwards them to the session manager.

A session starts by LUN capacity request (e.g. SCSI LUN capacity request command) and ends by LUN disconnect request received from the same session. The session manager 32 holds all the session's private data as, for example, source session address, session counters, session status, all instances for the buffers in use, etc. The session manager transfers all requests to a dispatcher 33 coupled to the session manager. The dispatcher 33 is coupled to a data block manager 34, buffer manager 35 and compression/decompression block 36.

The dispatcher 33 requests the data block manger 34 for data related transactions (e.g. Read, Write, etc.) and the compression/decompression block 36 for compression/decompression operations in accordance with certain embodiments of the present invention. Generally, compression algorithms have several compression levels characterized by trade-off between compression efficiency and performance parameters. The compression block 36 may select the optimal compression level and adjust the compression ratio to number of sockets currently handling by input/output block 31 (and/or CPU utilization). The information on the selected compression level is kept in the compression portion of data. The data block manager 34 is responsible for the order and memory sharing by the blocks of data. The compression/decompression block 36 is capable of reading and decompressing the buffer as well as of compressing and writing the data. The compression block is also configured to estimate the VLU size in accordance with LU size and expected compression rate (or predefined LU/VLU ratio) and report VLU size and free capacity in reply to Capacity status request.

The buffer manager 35 manages memory buffer recourses and is responsible for allocating and releasing memory buffer to any block operation.

The compression system further comprises an integrity manager 37 coupled to the session manager, the buffer manager and the data block manager. The integrity manager is responsible for synchronization and general control of all processes in the compression system.

Those skilled in the art will readily appreciate that the invention is not bound by the configuration of FIGS. 3; equivalent and/or modified functionality may be consolidated or divided in another manner.

Figure 4:
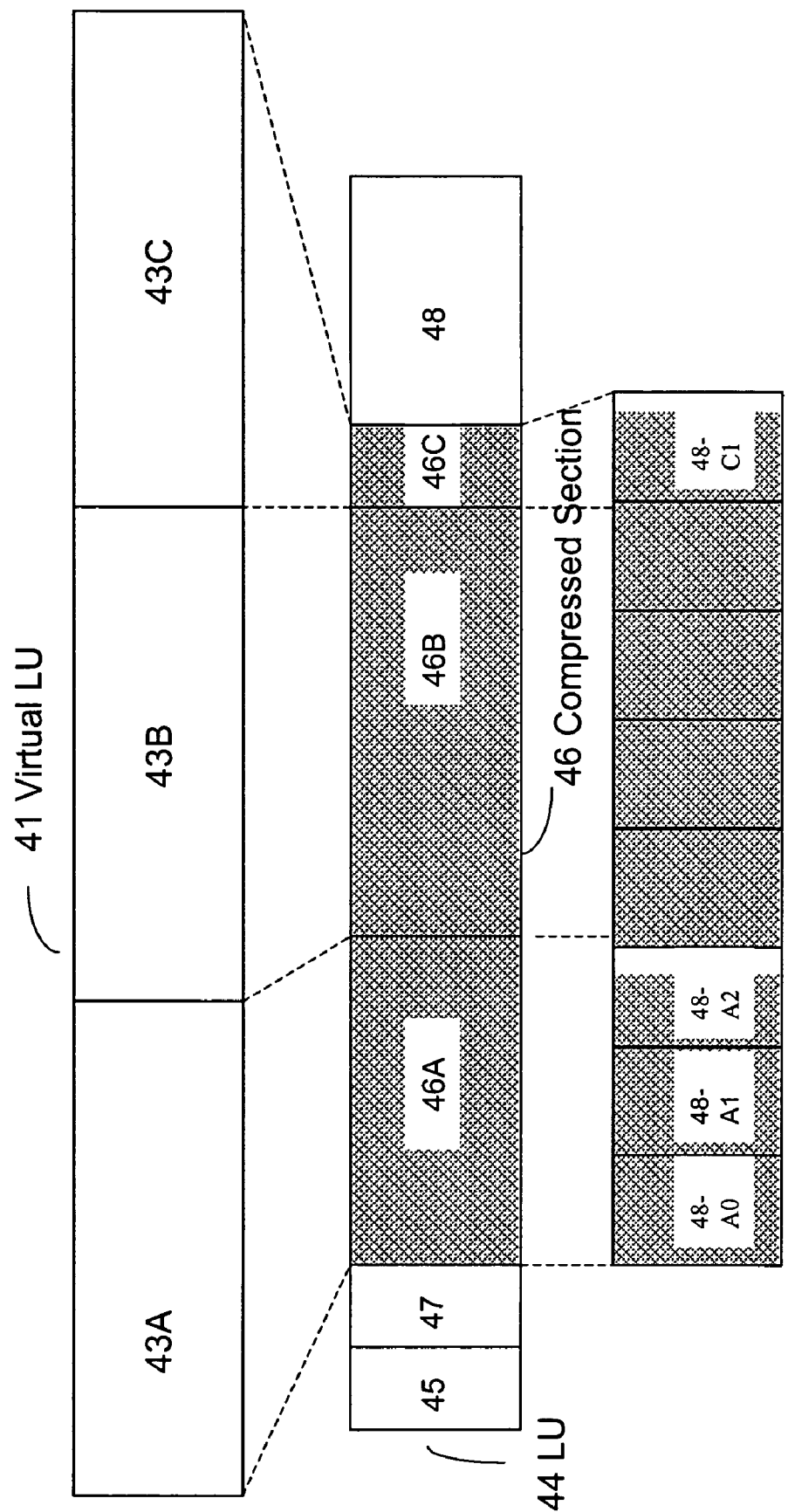
FIG. 4 is a schematic diagram of virtual logical unit and logical unit in accordance with certain embodiments of the present invention.

FIG. 4 illustrates a schematic diagram of raw and compressed data blocks in accordance with certain embodiments of the present invention. The virtual logical unit (VLU) 41 is segmented into virtual storage portions 43 with substantially equal predefined size (hereinafter referred to as virtual storage clusters or clusters). These virtual storage clusters serve as atomic elements of compression/decompression operations during input/output transactions (data access-related requests) on the data blocks. The size of the virtual storage clusters may be configurable; larger clusters provide lower processing overhead and higher compression ratio, while smaller clusters provide more efficient access but higher processing overhead. Also, the size of cluster depends on available memory and required performance, as compression/decompression process of each I/O transaction requires at least one cluster available in the memory while performance defines a number of simultaneous transactions. The number of clusters is equal to the integer of (size of the VLU divided by the size of cluster) and plus one if there is a remainder.

Alternatively, in certain other embodiments of the invention, the size of cluster may vary in accordance with pre-defined criteria depending, for example, on type of data (e.g. text, image, voice, combined, etc.), application assigned to the LUN, etc.

Each virtual storage cluster 43 (e.g. 43A-43C as illustrated in FIG. 4) corresponds to respective compressed section 46 within the logical unit (e.g. 46A-46C as illustrated in FIG. 4), storing the corresponding data compressed by the compression system 20. The clusters with the same size may naturally result in compressed sections with different size, depending on the nature of data in each cluster and compression algorithms. If an obtainable ratio of a cluster compression is less than a pre-defined value, the corresponding compressed section of the LU may comprise uncompressed data corresponding to this cluster. For instance, if the raw data in a given cluster is compressed to no less than X % (say 95%) of the original cluster size, then due to the negligible compression ratio, the corresponding section would accommodate the raw cluster data instead of the compressed data.

In certain embodiments of the invention, the compression process may include adaptive capabilities, providing optimal compression algorithm for each data block in accordance with its content (e.g. different compression algorithms best suited for clusters with dominating voice, text, image, etc. data)

In accordance with certain embodiments of the present invention each logical unit 44 comprises a header 45, several compressed sections 46, a section table 47 and a free space 48. The header 45 comprises unique descriptor containing a logical unit number (LUN), the size of the virtual logical unit (VLU) and a signature indicating whether at least part of the storing data were processed by the compression system 20. The header has a fixed length (e.g., by way of non-limiting example, 24 bytes including 4 bytes for the signature, 16 bytes for the unique descriptor and 4 byte for the info about size of the corresponding virtual logical unit).

The number of compressed sections within the LU is equal to the number of virtual storage clusters. In accordance with certain embodiments of the present invention, the data in the compressed sections 46 are stored in compression logical units (CLU) 48 all having equal predefined size (e.g., as illustrated in FIG. 4, compression logical units 48A0-48A2 correspond to the compressed section 46A which corresponds to the virtual storage cluster 43A). The predefined CLU size is configurable; larger CLUs provide lower overhead, while smaller CLUs lead to higher resolution. Also, in certain embodiments of the invention, the CLU size may be adjusted to the maximum and/or optimal size of data blocks.

The number of CLUs within a compressed section is equal to the integer of (size of the compressed section divided by the size of CLU) and plus one if there is a remainder. The last CLU in compressed section may be partly full (as, e.g. 48-A2, 48-C1 in FIG. 4). Such CLUs may be handled in the same manner as full CLUs. CLU may be considered as a virtual portion of the compressed storage formed by a virtual sequence of segments in the memory (physical storage medium). The relationship between CLUs and assigned memory segments is further described with reference to FIG. 11 below.

The section table 47 comprises records of all compressed sections 46 and specifies where to find CLUs corresponding to each of compressed sections. The record in respect of each of compressed sections (hereinafter section record) comprises a signature indicating if the section was compressed, overall size of the compressed section and a list of pointers pertaining to all CLUs contained in the section. Optionally the record may comprise indication of compression algorithm used during compression of the corresponding cluster and size of cluster (if variable per predefined criteria). As will be further illustrated with reference to FIG. 5, the length of the section table has a fixed length proportional to a number of compressed sections and, accordingly, to a predefined number of virtual storage clusters.

Figure 5:
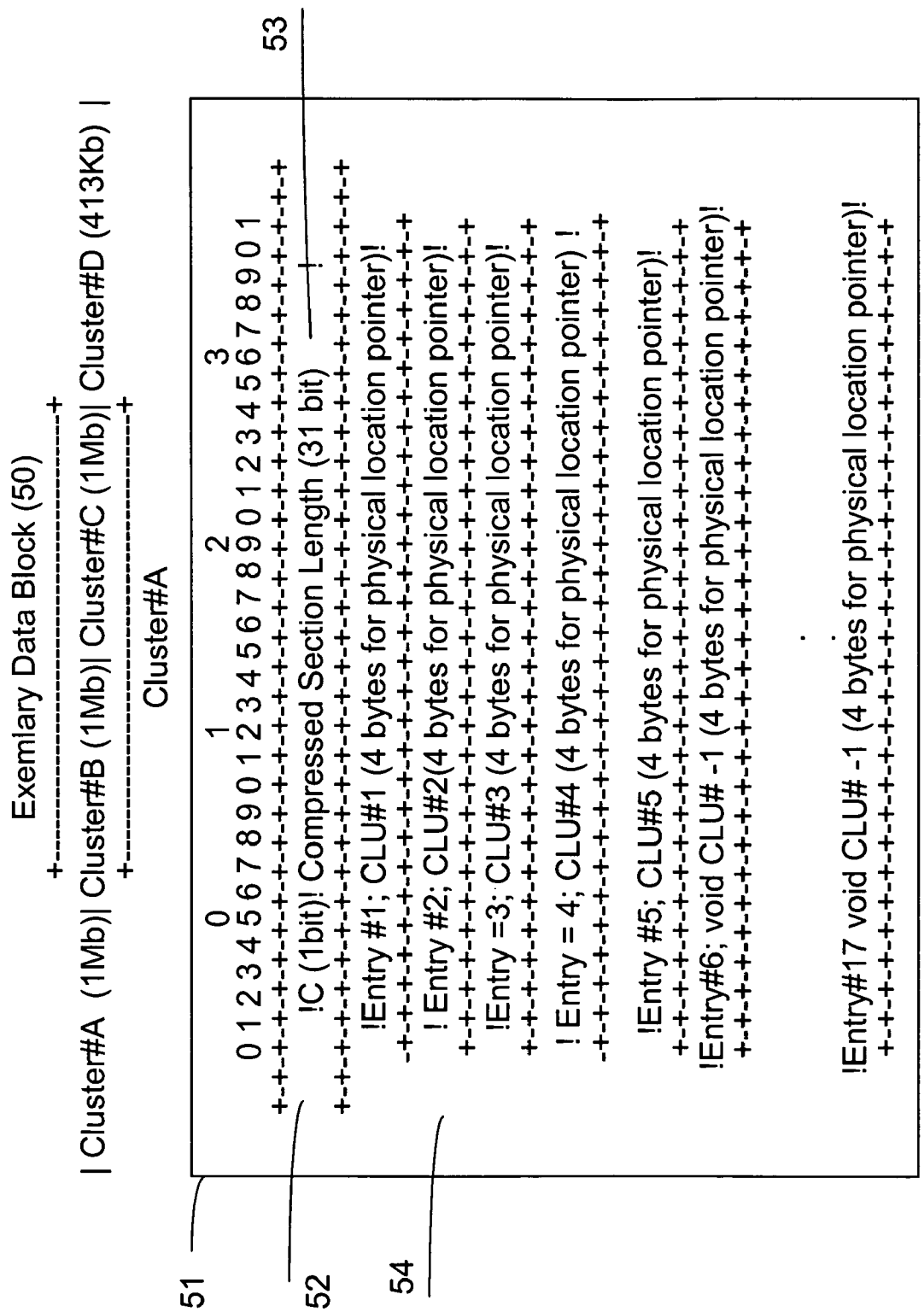
FIG. 5 is an exemplary structure of section table in accordance with certain embodiments of the present invention.

FIG. 5 illustrates, by way of non-limiting example, exemplary records in the section table in respect of an exemplary data block 50.

A record 51 of a compressed section comprises a signature 52, size of the section 53 and several entries 54. Each entry 54 of the section record comprises information about one of CLUs contained in the compressed section. The section table comprises relationship between the physical location and the logical CLU #.

The exemplary raw data block 50 (referred to also in further examples) has original size 3 MB+413 bit. For the example purposes, the predefined cluster size is 1 M and CLU size is 60K. Accordingly, the data block will require 4 virtual storage clusters (3 clusters of 1 MB and one which is partly full, but handled as complete cluster).

The clusters for virtual storage (accommodation) of the exemplary data block 50 correspond to compressed sections with respective sizes of, e.g., 301123, 432111, 120423 and 10342 bytes. As CLU length of 60K means 61440 bytes, the section #0 has 5 allocated CLUs ([301123/61440]+1); section #1 has 8 allocated CLUs ([432111/61440] +1); section #2 has 2 allocated. CLUs ([120423/61440]+1) and section #3 has 1 allocated CLU ([10342/61440]+1). Totally, the compressed data block will comprise 16 CLUs (with total size 15*61440 bytes+10342 bytes)., If the exemplary data block 50 was stored for the first time, the CLUs will have sequential allocation of physical locations, for example, First 5 CLUs with physical location pointers 1, 2,3,4,5 will be allocated to Section 0;

Next 8 CLUs with the pointers 6, 7, 8,9,10,11,12,13 will be allocated to Section 1;

Next 2 CLUs with the pointers 14, 15 will be allocated to Section 2;

Next 1 CLUs with the pointer 16 will be allocated to Section 3.

As will be further described with a reference to FIGS. 8-11 below, the distribution of CLUs corresponding to the data block may be changed after an update (in the current example the updates had no impact on the size of the compressed sections). For example, CLUs with the pointers 1, 4,5,6,9 will be allocated to Section 0;

CLUs with the pointers 2,3,7,10,11,12,15,14 will be allocated to Section 1;

CLUs with the pointers 8, 13 will be allocated to Section 2;

CLUs with the pointer 16 will be allocated to Section 3.

When the data block has been stored for the first time, the virtual (logical) sequence of CLUs is the same as physical sequence of a storage media segments corresponding to the CLUs. In an updated data block, virtual (logical) sequence of CLUs may differ from the physical sequence of disk segments corresponding to the CLUs. For instance in the example above, the second CLU of the first cluster was initially located at a physical segment #2 wherein after the update it is located at the physical segment #4. Each CLU is assigned to a segment in a memory, the correspondent segment is written in the offset of the header 45 length plus CLU's length multiplied by the segment serial number. For example, in the exemplary data block above, when the second CLU of the first cluster is located at the physical segment #2, it is written in the storage location memory in the offset 24 bytes of the header plus 2*61440 bytes. When after an update this CLU is located at the physical segment #4, its offset becomes 24 bytes of the header plus 4*61440 bytes.

In certain embodiments of the invention, the number of entries in each section record is constant and corresponds to the maximal number of CLUs which may be required for storing the cluster. Accordingly, the size of each section record is constant regardless of the actual number of CLUs comprised in the section; not in use entries may have special marks. The number of entries in the section records is equal to integer of size of cluster divided by the size of CLU plus one. The size of the section table is equal to the size of section record multiplied by the predefined number of clusters in the VLU.

In the illustrated example with clusters predefined size 1 MB and CLU's predefined size 60 K, each record of compressed section has 17 entries (integer of 1 MB/60K plus one) each one having 4 bytes. Respectively, the illustrated section record 51 of the compressed section #0 has 5 entries containing information about physical location of the correspondent CLUs and 12 empty entries (marked, e.g. as −1). The size of section record is 72 bytes (4 bytes for info on the compressed section size and signature plus 17 entries*4 bytes). The overall size of the section table is 288 bytes (4 compressed sections*72 bytes for each section record).

FIGS. 6-11 illustrate input/output operations performed on a compressed data in accordance with certain embodiments of the present invention. Note that in accordance with certain embodiments of the present invention, the compression system 20 intervenes also in commands referring to the size of available storage (estimated storage space for raw data), keeping the size of VLU in the header of correspondent LU and providing said data upon request.

Figure 6:
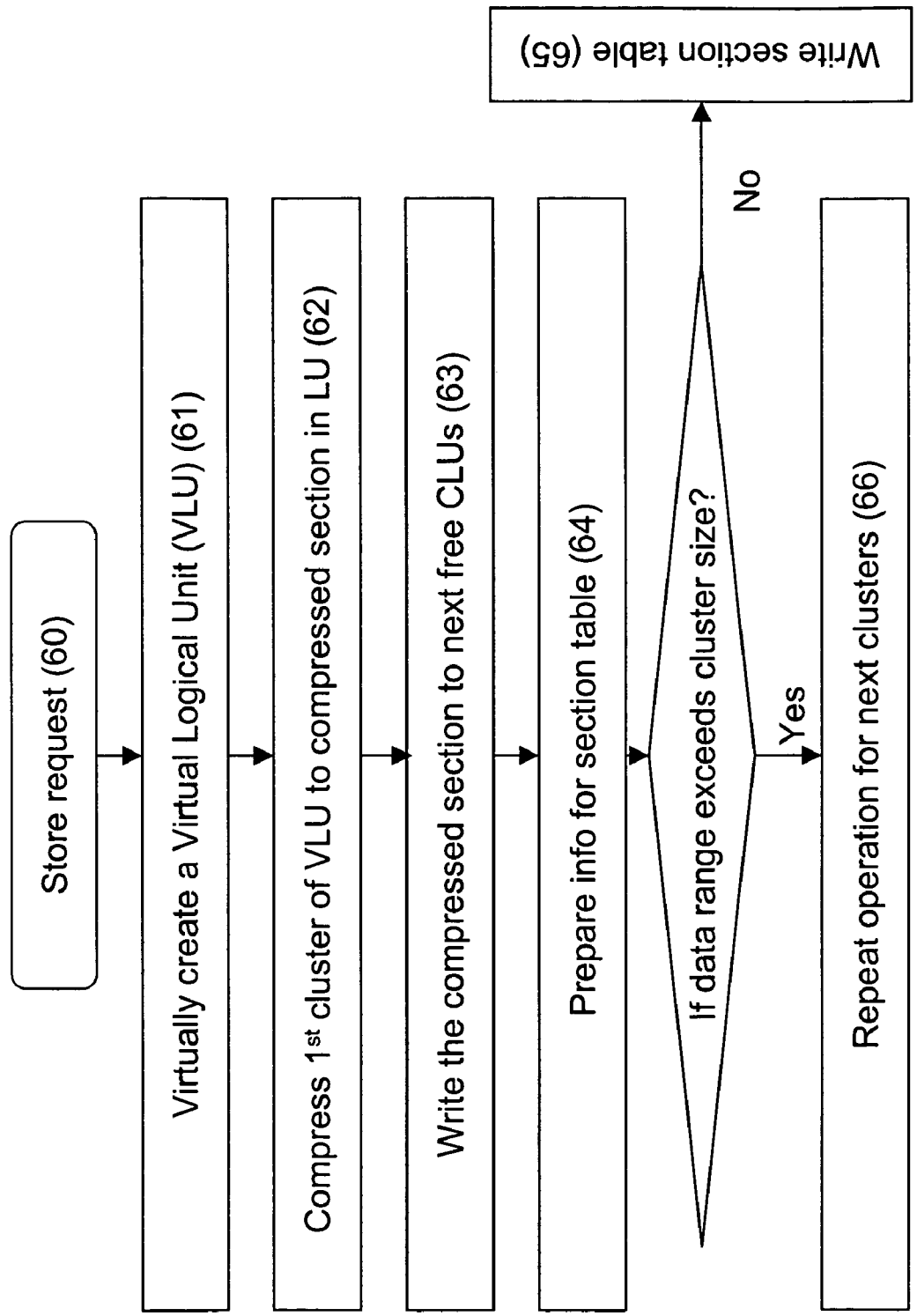
FIG. 6 is a generalized flowchart of operation of compressed data block creation in accordance with certain embodiments of the present invention.

Referring to FIG. 6, there is illustrated a generalized flow-chart of compressed data block creation in accordance with certain embodiments of the present invention. Upon request 60 to store a block of data, the compression system 20 virtually creates 61 the Virtual Logical Unit as described with reference to FIGS. 2a-2c or refers to a VLU created when storing a previous data block(s). At the next step 62 the compression system processes the first fixed-size portion (cluster) of the raw data into compressed section having size X. (The compression may be provided with a help of any appropriate commercial or specialized algorithm). The compression system defines first free storage location for the first CLU, starts and handles continuous writing 63 of the compressed section in this and sequential CLUs for storing at the storage device, and prepares 64 the pointers of the CLUs occupied during the process to be recorded in the section table. The compression system repeats 65 the process for next clusters until the data of the entire data block are written in the compressed form and the section table is created 66.

Figure 7:
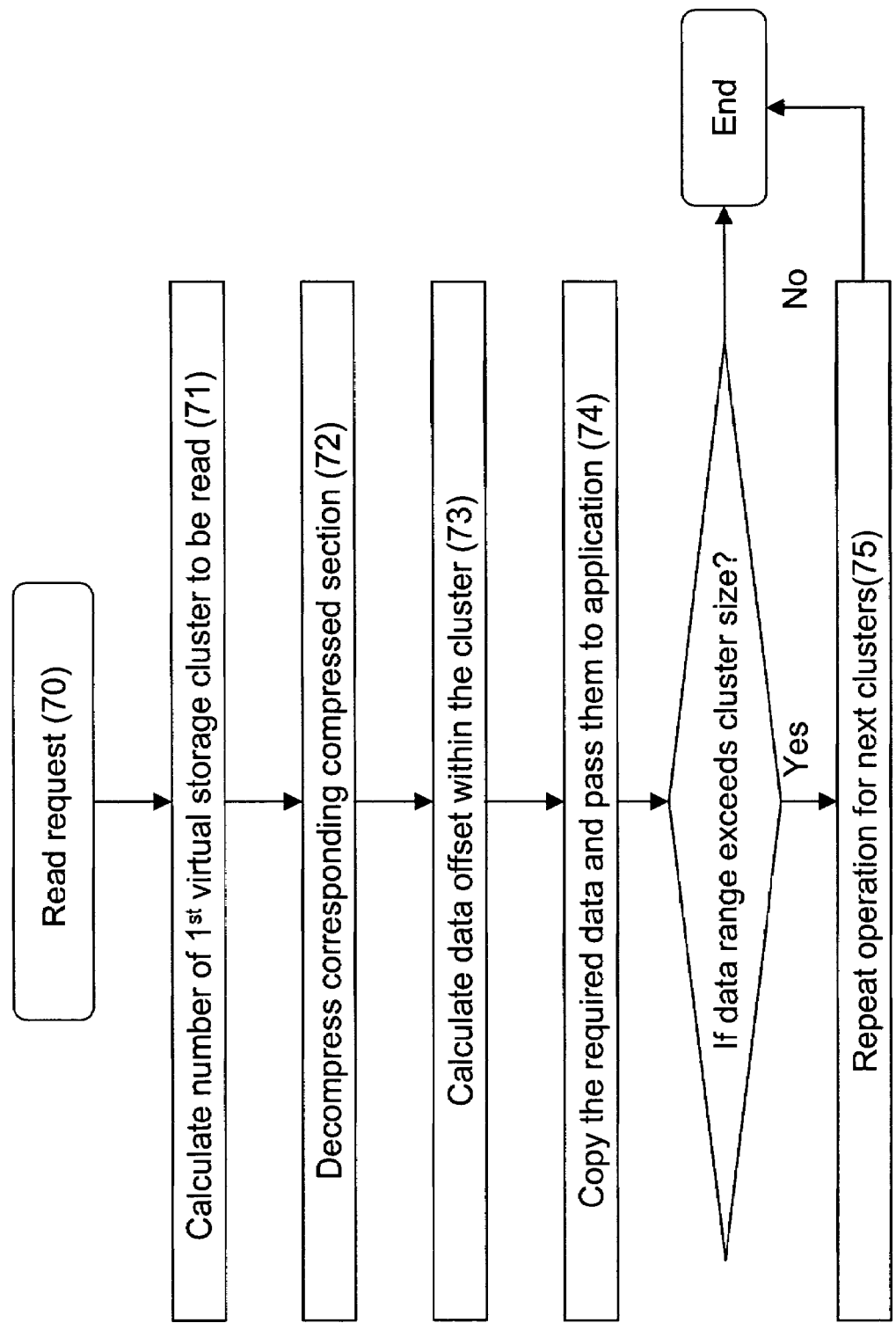
FIG. 7 is a generalized flowchart of read operation on a compressed data block in accordance with certain embodiments of the present invention.

Referring to FIG. 7, there is illustrated a generalized flow-chart of read operation on a compressed data block in accordance with certain embodiments of the present invention.

The read operation starts read request 70 identifying the offset of data in the VLU and the range Y of data to read. It should be reminded that as was described with reference to FIGS. 2a)-2c), the computer's operating system (OS) will relate on the VLU as a virtual representation of raw data storage, the compression system will compress the corresponding data to the LU of the storage device and facilitate mapping between the compressed data and their virtual representation at the VLU.

The compression system 20 calculates 71 the serial number of the $1^{st}$ virtual storage cluster to be read (hereinafter the starting cluster) as integer of (offset divided by size of the cluster) and plus one if there is a remainder. The number of clusters to be read is defined by integer of (range of data to be read divided by size of the cluster) plus one. As a result, the compression system defines the compressed section(s) with one-to-one correspondence to the clusters to be read and points to the CLUs corresponding to the compressed section (s) to be decompressed and read.

In certain embodiments of the invention, all the range of the data to be read may be entirely decompressed. Alternatively, as illustrated in FIG. 7, the decompression may be provided in steps, and for read operation the compression system may maintain a buffer substantially equal to the size of cluster. The first read request comprises pointers to CLUs contained in the compresses section of the starting cluster. The entire compressed section corresponding to the starting cluster is read and uncompressed 72 by the compression system to the target buffer. At the next step the compression system calculates 73 the required offset within the cluster and copies the required data 74 to be passed to the application. The required length of copying data is calculated as follows:

Length=Minimum{data range Y;(cluster size−offset mod cluster size)}

If the data range Y exceeds the cluster size, the operation is repeated 75.

For example, referring to the exemplary data block 50, request is to read data of 20 bytes length from the offset 1 MB+1340. Reading will start from the second cluster and, accordingly, the required data are contained in compressed data block starting from $2^{nd}$ compressed section. The record of the $2_{nd}$ compressed section in the section table contains CLUs with pointers 2,3,7,10,11,12,15,14. Accordingly, these CLUs will be read to a temporary buffer in the compression system 20 and uncompressed to 1 MB buffer (e.g. in the compression system). Then 20 bytes from the buffer offset 1340 will be moved to the target (user's) buffer. The required length of copying data is 20 bytes (equal to minimum between 20 bytes and (1 MB-1340 bytes)). If the other request were to read data of 2 MB length from the same offset, the operation would be repeated in a similar manner to $3^{rd}$ and $4^{th}$ compressed sections; and the required length of data copying from the starting cluster is 1 MB-1340 bytes (equal to minimum between 2 MB and (1 MB-1340 bytes)).

Figure 8:
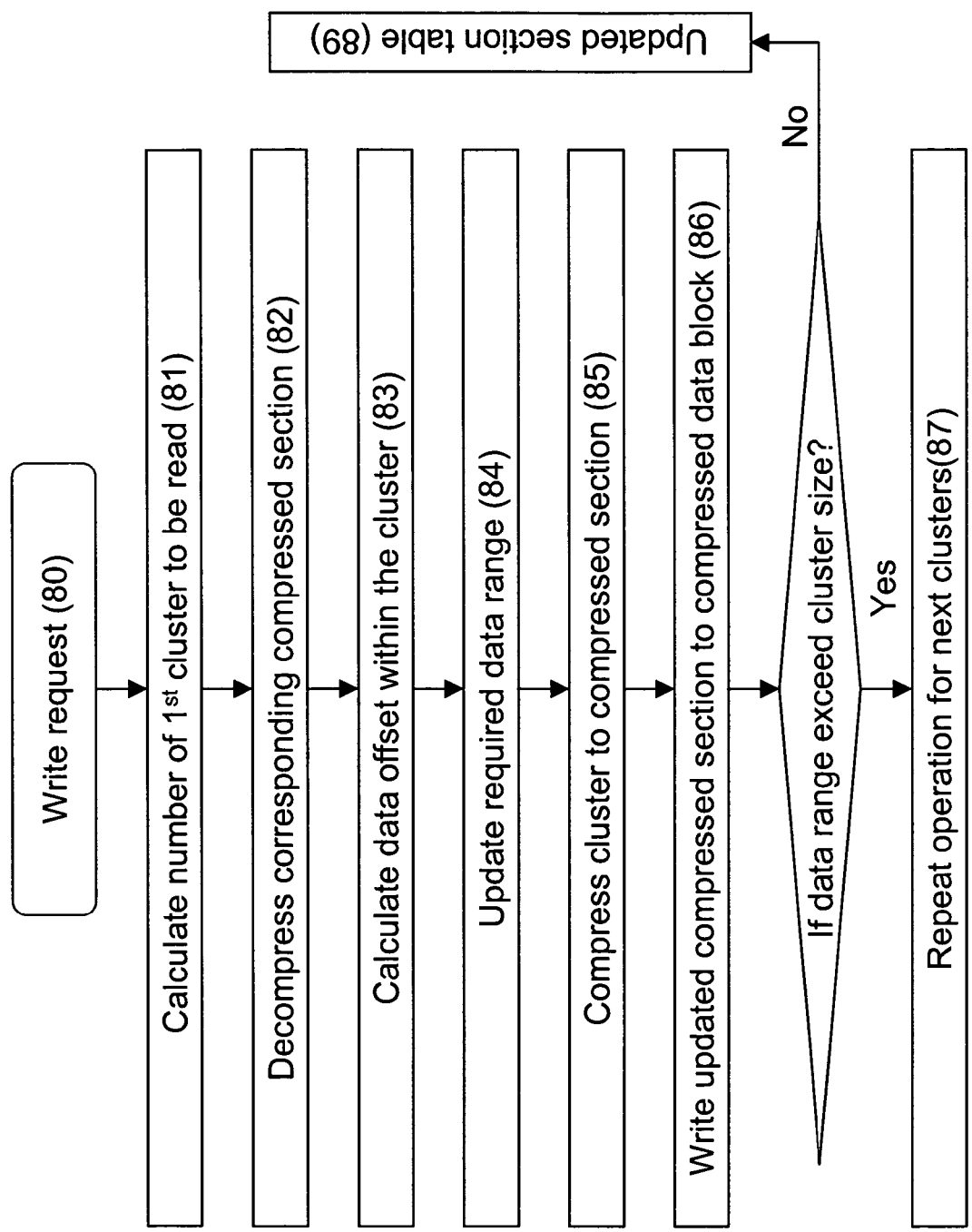
FIG. 8 is a generalized flowchart of write operation on a compressed data block in accordance with certain embodiments of the present invention.

Referring to FIG. 8, there is illustrated a generalized flow-chart of write operation on a compressed data block in accordance with certain embodiments of the present invention. A "write" request 80 identifies the offset in VLU and the range Y of data to write. The compression system 20 calculates 81 the serial number of the $1^{st}$ virtual storage cluster to be updated (overwrite) as integer of (offset divided by size of the cluster) and plus one if there is a remainder. The number of virtual storage clusters to overwrite is defined by integer of (range of data to write divided by size of the cluster) and plus one if there is a remainder. As a result, the compression system defines the compressed section(s) to overwrite and generates read request in a manner similar to that described with reference to FIG. 7. After the entire compressed section corresponding to the starting cluster is read and uncompressed 82 by the compression system to the buffer, the compression system calculates 83 the required offset within the cluster as described with reference to FIG. 7 and updates (overwrites) the required data range 84. Then, the compression system compresses 85 the updated cluster, updates the section table and requests to write 86 the new compressed section to the compressed data block. If the data range Y exceeds the cluster size, the operation is repeated 87 for successive clusters. Upon the end of the process, the compression system updates the section table 88.

As described above, in certain embodiments of the present invention the storage location of required data may be accessed directly and, accordingly, read/update (and similar)

operations require restoring merely the virtual clusters containing the required data range and not the entire data blocks.

Figure 9:
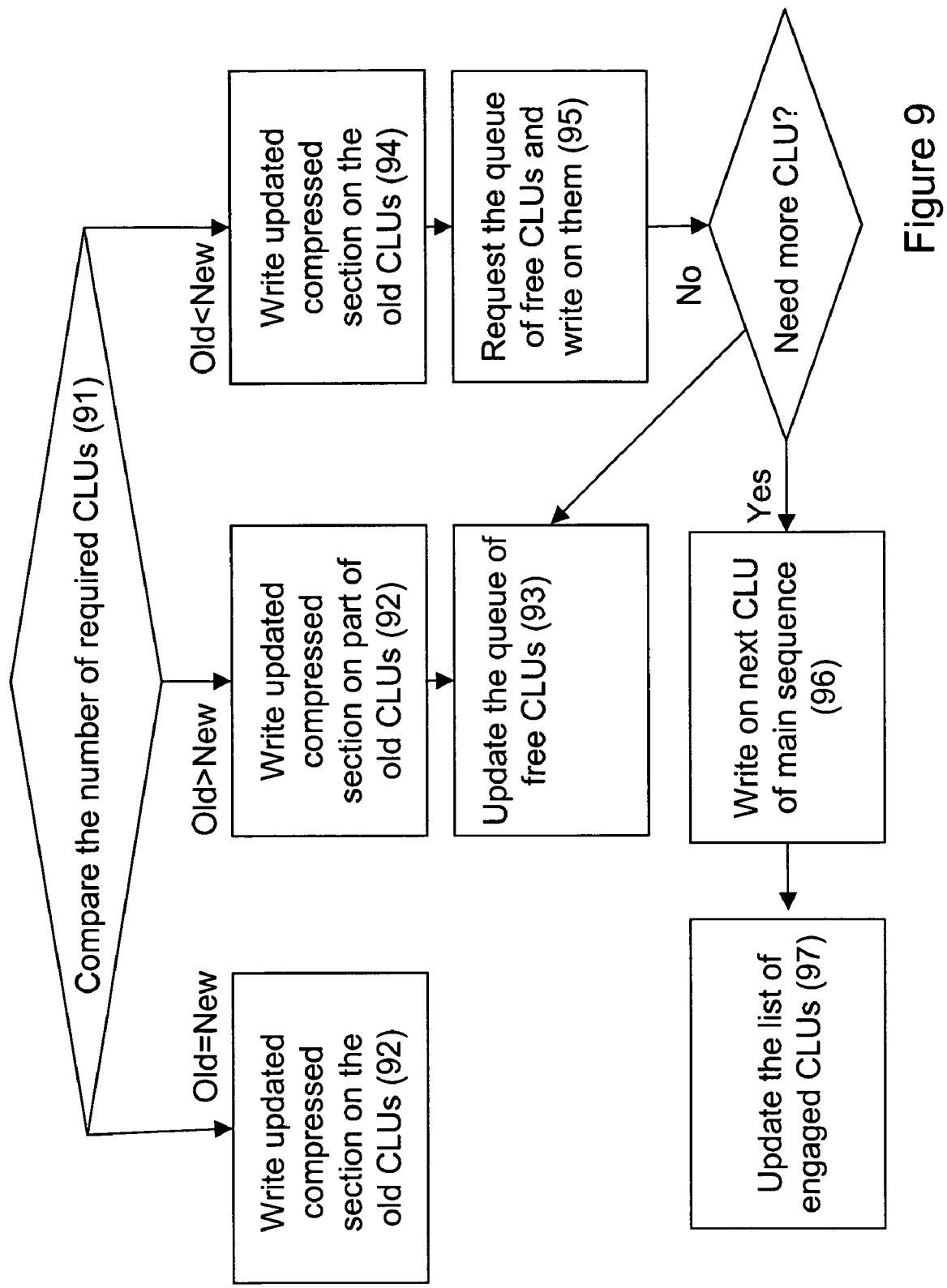
FIG. 9 is a generalized flowchart illustrating sequence of write operation on a compressed section in accordance with certain embodiments of the present invention.
Figure 10:
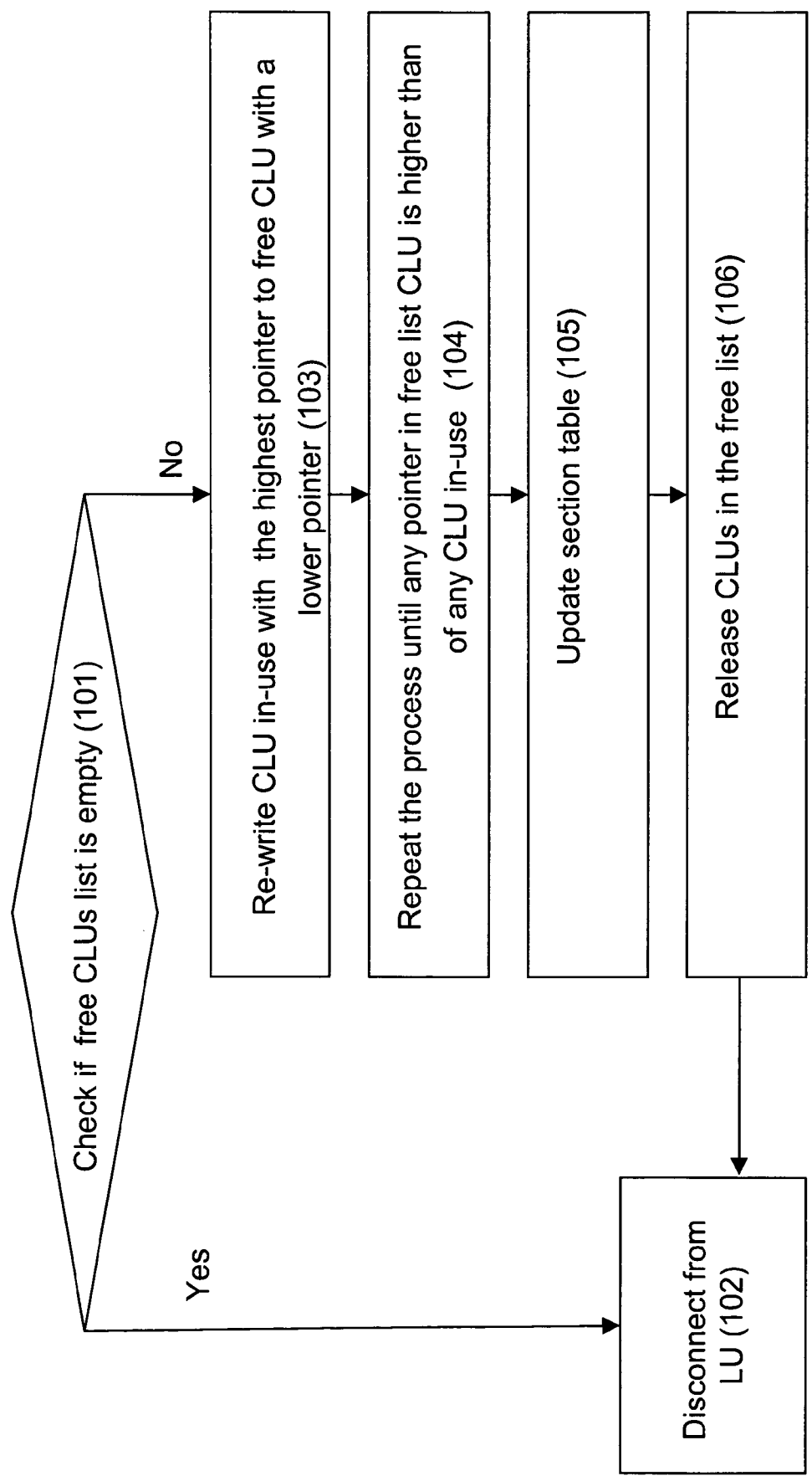
FIG. 10 is a generalized flowchart of CLU management in accordance with certain embodiments of the present invention during disconnecting from a storage logical unit.

Typically, data block updating may cause fragmentation because of unused space aroused in allocated storage. FIGS. 9 and 10 illustrate fragmentation handling algorithms of CLU management in accordance with certain embodiments of the present invention. FIG. 9 illustrates an algorithm of CLU management during write/update operation on a compressed section (step 86 in FIG. 8) in accordance with certain embodiments of the present invention. Before writing the updated compressed section, the compression system compares 91 the number of CLUs required for the updated and old compressed sections. If the number of CLUs is unchanged, the compression system 20 requests to write the updated compressed section sequentially to all CLUs 92 corresponding to the old compressed section. If the new number of the required CLUs is less than the old number, the compressed section will be written sequentially on a part of CLUs corresponding to the old compression section. The information about released CLUs is updated 93 in a special list (queue) of free CLUs handled by compression system 20 until the LU is disconnected. If the new number of the required CLUs is more than the old number, the compressed section will be written sequentially on all CLUs corresponding to the old compression section 94 and then on CLUs taken from the free CLUs queue 95. If still more CLUs are required, the compression system will define the last CLU allocated to the data block (#n) and request to write sequentially on CLUs starting with number (n+1) (96); the list of allocated CLUs will be accordingly updated 97.

FIG. 10 illustrates an algorithm of CLU management during disconnecting from a storage logical unit.

Before disconnecting 102 from LU, the compression system checks 101 if the list of free CLUs is empty. If the list still comprises CLUs, the compression system 20 defines a CLU with the highest storage location pointer among CLUs in-use. Compressed data contained in said CLU are transferred 103 to a free CLU with a lower pointer and the emptied CLU is added to the list of free CLUs. The process is repeated 104 until all the pointers of CLUs in-use are lower than the pointer of any CLU comprising in the list of free CLUs. The section table will be accordingly updated 105. Such updates may occur per each of said CLU re-writing, after the end of entire re-writing process or in accordance with other predefined criteria. At the end of the process the LU is disconnected and free CLUs are released 106. The selection of free CLU for above process may be provided in accordance with different algorithms. For example, in certain embodiments of the invention said compressed data from the CLU with the highest storage location pointer may be transferred to the free CLU with the lowest storage location pointer.

Figure 11A:
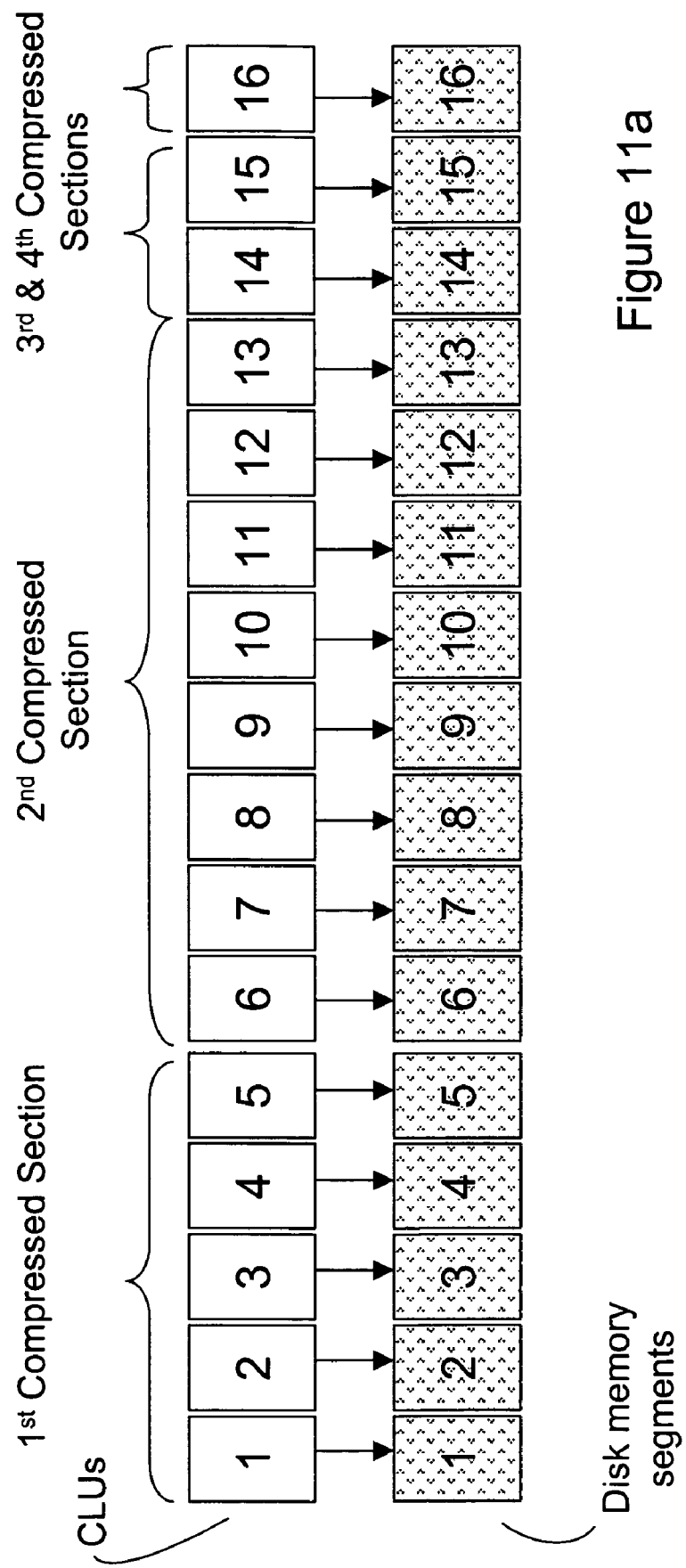
FIGS. 11a-11c are schematic illustrations of relationship between CLUs and assigned disk memory segments in accordance with certain embodiments of the present invention.
Figure 11B:
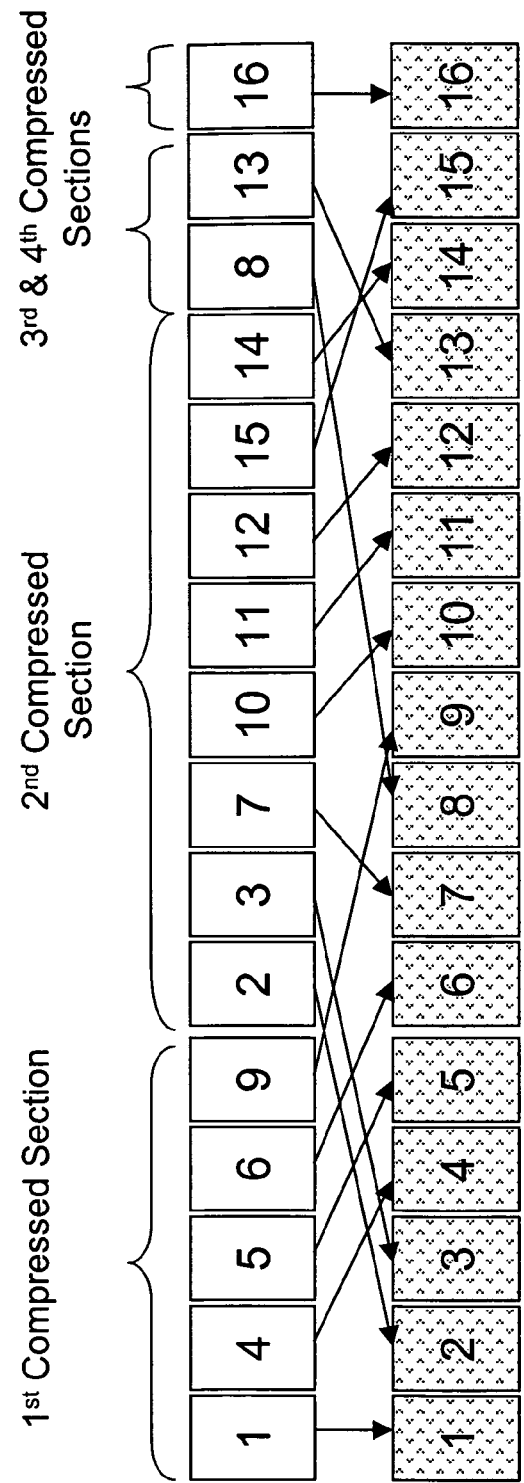
Figure 11C:
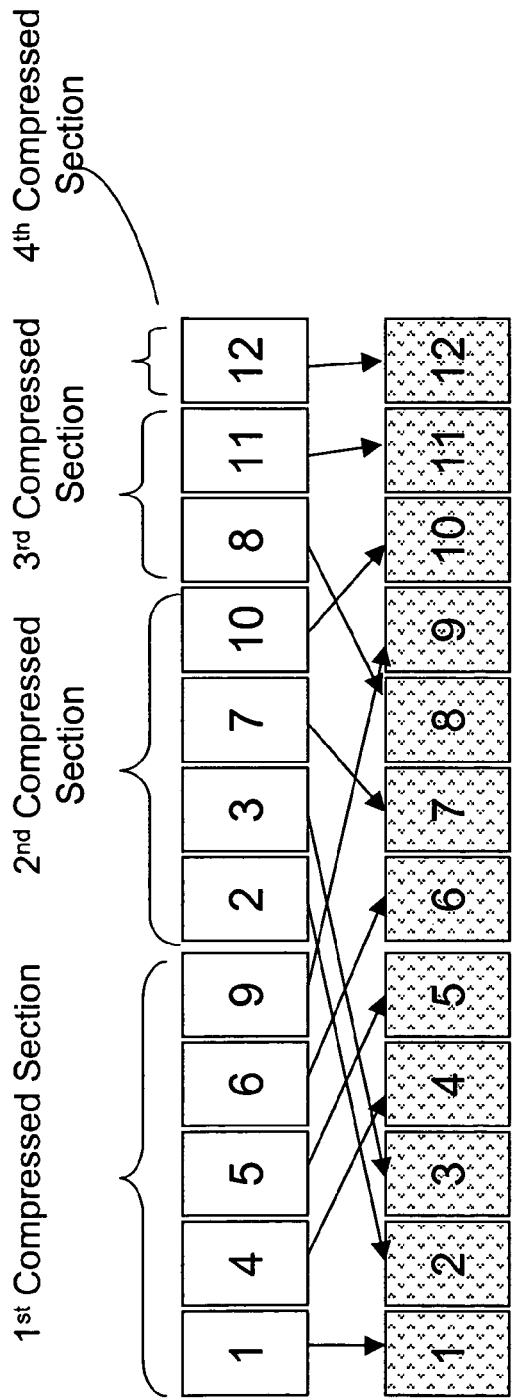

Referring to FIGS. 11a-11c, there are illustrated relationship between CLUs and assigned disk memory segments in accordance with certain embodiments of the present invention. FIG. 11a illustrates exemplary data block 50 illustrated in FIG. 5 when created as new compressed data block. The virtual (logical) sequence of CLUs is the same as physical sequence of disk segments corresponding to the CLUs (numbers within CLUs are illustrating pointers to the respective disk memory segments). FIG. 11b illustrates the new distribution of CLUs within the updated compressed data block with unchanged size of the compressed sections as in the updated exemplary data block described with reference to FIG. 5. The virtual (logical) sequence of CLUs differs from the physical sequence of disk segments corresponding to the CLUs whilst maintaining de-fragmented structure of the LU. FIG. 11c illustrates the de-fragmented distribution of CLUs within updated exemplary compressed data block 50, wherein the size of $2^{nd}$ compressed section has been changed after an update from 432111 to 200100 bytes. If, for example, the update offset is 1 MB+314 bytes, the first compressed section is unaffected during the update. The new size of $2^{nd}$ compressed section requires allocation of only 4 CLUs ([200100/61440]+1). Note, as shown in FIG. 11B, that before the update the second compressed section accommodated 8 CLUs (Nos. 2, 3, 7, 10, 11, 12, 15 and 16). As described with reference to FIG. 9, the compression system 20 will write the updated $2^{nd}$ compressed section on first 4 CLUs from the compressed section (2, 3,7,10 in the present example) and send CLUs with pointers 11, 12, 15 and 16 to the list of free CLUs. $3^{rd}$ and $4^{th}$ compressed sections are also unaffected during this particular update. As described with reference to FIG. 10, the compression system 20 before disconnecting from LU will check if the list of free CLUs is empty. By this example the list contains CLUs with storage location pointers 11, 12, 15 and 16. As described with reference to FIG. 10, the compression system will re-write compressed data from CLU with pointer 13 to CLU with pointer 11; compressed data from CLU with pointer 16 to CLU with pointer 12 and release CLUs with pointers 13-16. Thus the updated data block has 12 allocated CLUs with no de-fragmentation.

Additional requirements (e.g. secure access, data integrity, etc.) may lead to more complicated communication between the compression system and the computer.

It is also to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present invention.

Those skilled in the art will readily appreciate that various modifications and changes can be applied to the embodiments of the invention as hereinbefore described without departing from its scope, defined in and by the appended claims.

The invention claimed is:

1. For use in a storage network operable with a block mode access storage protocol, a method of operating a compression system operatively coupled with at least one computer and with at least one storage logical unit accommodating compressed data, said method comprising:
   a. creating in respect to the storage logical unit a corresponding virtual logical unit configured to virtually represent in non-compressed form the data stored in the storage logical unit, wherein a size of the virtual logical unit corresponds to an estimated size of raw data which, being compressed, would substantially amount to a size of the storage logical unit and providing the following:
      i). segmenting the virtual logical unit into one or more virtual storage portions (clusters);
      ii). compressing the data represented in said clusters and thereby generating compressed sections of variable size within the storage logical unit corresponding to said clusters; and
      iii). dividing at least one compressed section of said compressed sections into at least one fixed-size compression logical units (CLU) and creating a section table with at least one record describing each of said at least one compressed section, said record holding at least information on CLUs corresponding to the at least one compressed section and storage location pointers pertaining to said CLUs;
b) intercepting "read given data range" data access related requests from said at least one computer addressed to the storage logical unit and addressing said request to the virtual logical unit and providing the following operations:
   i). determining a first cluster to be read in accordance with the request;
   ii). determining a corresponding compressed section;
   iii). determining the CLUs corresponding to said compressed section and storage location thereof by referring to the section table;
   iv). facilitating restoring the data corresponding to said cluster from said CLUs; and
   v). repeating the stages i)-v) for next clusters if said certain data range exceeds the first restored cluster, until all data to be read are restored; and
c) facilitating mapping between the compressed data stored in the compressed sections and their representation at the virtual logical unit.

2. For use in a storage network operable with a block mode access storage protocol, a method of operating a compression system operatively coupled with at least one computer and with at least one storage logical unit accommodating compressed data, said method comprising:
a. creating in respect to the storage logical unit a corresponding virtual logical unit configured to virtually represent in non-compressed form the data stored in the storage logical unit, wherein a size of the virtual logical unit corresponds to an estimated size of raw data which, being compressed, would substantially amount to a size of the storage logical unit and providing the following:
   i). segmenting the virtual logical unit into one or more virtual storage portions (clusters);
   ii). compressing the data represented in said clusters and thereby generating compressed sections of variable size within the storage logical unit corresponding to said clusters; and
   iii). dividing at least one compressed section of said compressed sections into at least one fixed-size compression logical units (CLU) and creating a section table with at least one record describing each of said at least one compressed section, said record holding at least information on CLUs corresponding to the at least one compressed section and storage location pointers pertaining to said CLUs;
b) intercepting "write data at a given data range" data access-related requests from said at least one computer addressed to the storage logical unit and addressing said request to the virtual logical unit and providing the following operations:
   i) determining first cluster to be updated thereby constituting the original cluster;
   ii) determining a corresponding original compressed section;
   iii) determining the CLUs corresponding to said original compressed section and storage location thereof by referring to the section table;
   iv) facilitating restoring the data from said original compressed section;
   v) calculating an offset of the updating data within corresponding cluster and facilitating the update at the given data range;
   vi) compressing the updated cluster into an updated compressed section;
   vii) facilitating overwriting said original compressed section with updated compressed section;
   viii) tip dating the section table;
   ix) repeating stages ii) to ix) for next clusters if the range of data to be written exceeds the first restored cluster, until all required data are written,
c) handling a list of free CLUs released during writing data, said list is handled until the storage logical unit is disconnected;
d) comparing the number $N_o$ of CLUs required to said original compressed section and number $N_u$ required to said updated compressed section and facilitating one of the following:
   i. overwriting all CLUs corresponding to the original compressed section with CLUs corresponding to the updated compressed section if $N_o = N_u$;
   ii. overwriting first $N_u$ CLUs corresponding to the original compressed section with CLUs corresponding to the updated compressed section and updating the list of free CLUs about released CLUs if $N_o > N_u$;
   iii. overwriting all CLUs corresponding to the original compressed section with CLUs corresponding to the updated compressed section and writing the rest of CLUs corresponding to the updated compressed section to the CLUs contained in the list of free CLUs, if $N_o < N_u < N_o + N_f$, where $N_f$ is a number of CLUs in said list; and
   iv. overwriting all CLUs corresponding to the original compressed section with CLUs corresponding to the updated compressed section, writing the CLUs corresponding to the updated compressed section to the CLUs contained in the list of free CLUs, and continuous writing the rest of CLUs corresponding to the updated compressed section to next free storage location if $N_o + N_f < N_u$; and
e) facilitating mapping between the compressed data stored in the compressed sections and their representation at the virtual logical unit.

3. A communication device operable in a storage network being configured to perform the method stages of claim 2.

4. A storage device operable with at least one block mode access storage protocol and being configured to perform the method stages of claim 2.

5. A computer program comprising computer program code means for performing all the stages of claim 2 when said program is run on a computer.

6. A computer program as claimed in claim 5 embodied on a computer readable medium.

7. For use in a storage network operable with a block mode access storage protocol, a compression system operatively coupled with at least one computer and with at least one storage logical unit, said system comprising:
a. means for compressing raw data to be stored in said at least one storage logical unit;
b. means for creating in respect to the storage logical unit a corresponding virtual logical unit configured to virtually represent in non-compressed form the data stored in the storage logical unit, wherein a size of the virtual logical unit corresponds to an estimated size of raw data which, being compressed, would substantially amount to a size of the storage logical unit and including the following:
   i). means for segmenting the virtual logical unit into one or more virtual storage portions (clusters);
   ii). means for compressing the data represented in said clusters and thereby generating compressed section within the storage logical unit corresponding to said clusters;

iii). means for dividing at least one compressed section into at least one fixed-size compression logical units (CLU) and creating a section table with at least one record describing each of said at least one compressed section, said record holding at least information on CLUs corresponding to the at least one compressed section and storage location pointers pertaining to said CLUs;

c) means for intercepting "read given data range" data access related requests from said at least one computer addressed to the storage logical unit and addressing said request to the virtual logical unit, said means for intercepting further comprising:
  i) means for determining first cluster to be read in accordance with the request;
  ii) means for determining a corresponding compressed section;
  iii) means for determining the CLUs corresponding to said compressed section and storage location thereof by referring to the section table;
  iv) means for facilitating restoring the data corresponding to said cluster from said CLUs; and
  v) means for repeating the processing of said preceding means i)-v) for next clusters if said certain data range exceeds the first restored cluster, until all data to be read are restored; and d. means for facilitating mapping between the compressed data and their virtual accommodation at the virtual logical unit.

8. The system of claim 7, constituting a part of a communication device operable in a storage network.

9. The system of claim 7, constituting a part of a storage device operable with at least one block mode access storage protocol.

10. The system of claim 7, wherein coupling to at least one storage logical unit is provided in a serial manner, and the system is configured to act as a transparent bridge in respect to the storing data.

\* \* \* \* \*

UNITED STATES PATENT AND TRADEMARK OFFICE
CERTIFICATE OF CORRECTION

PATENT NO. : 7,424,482 B2
APPLICATION NO. : 11/258379
DATED : September 9, 2008
INVENTOR(S) : Nadev Kedem, Jonathan Amit and Noah Amit Page 1 of 1

It is certified that error appears in the above-identified patent and that said Letters Patent is hereby corrected as shown below:

On the Title Page, Item (75)

Please change the inventors name from the incorrect spelling from "NOACH AMIT" to the corrected spelling of "NOAH AMIT" and the incorrect spelling from "YONI AMIT" to the corrected spelling of "JONATHAN AMIT".

Signed and Sealed this
Third Day of January, 2012

David J. Kappos
*Director of the United States Patent and Trademark Office*